United States Patent
Rong et al.

(12) 
(10) Patent No.: US 6,417,132 B1
(45) Date of Patent: Jul. 9, 2002

(54) PROCESS FOR PREPARING A CARRIER USED IN OLEFIN POLYMERIZATION CATALYSTS

(75) Inventors: Junfeng Rong; Wei Zhang; Zhenhua Jing; Xiaoyu Hong, all of Beijing (CN)

(73) Assignee: China Peirochemical Corporation (CN)

( * ) Notice: Subject to any disclaimer, the term of this patent is extended or adjusted under 35 U.S.C. 154(b) by 0 days.

(21) Appl. No.: 09/511,851

(22) Filed: Feb. 23, 2000

(30) Foreign Application Priority Data

Feb. 26, 1999 (CN) .......................... 99/00847 A

(51) Int. Cl.[7] .......................... B01J 31/00; B01J 37/00; C08F 4/02; C08F 4/60
(52) U.S. Cl. .................. 502/169; 502/172; 502/103; 502/226; 568/851
(58) Field of Search .............. 502/169, 171, 502/172, 226; 568/851

(56) References Cited

U.S. PATENT DOCUMENTS

| 4,399,054 A | 8/1983 | Ferraris et al. ......... 252/429 B |
| 6,127,304 A | * 10/2000 | Sacchetti et al. ........... 502/172 |

FOREIGN PATENT DOCUMENTS

| CN | 1047302 | 11/1990 |
| CN | 1085569 | 4/1994 |
| CN | 1089622 | 7/1994 |
| EP | 0859014 | 8/1998 |
| GB | 2028347 | 3/1980 |

OTHER PUBLICATIONS

J.C.J. Bart et al., J. Mater. Sci., vol. 30, pp. 2809–2820, 1995.*
English Translation of Abstract of CN 1089622 Dated Jul. 20, 1994.
English Translation of Abstract of CN 1047302 Dated Nov. 28, 1990.
English Translation of Abstract of CN 1085569 Dated Apr. 20, 1994.

* cited by examiner

Primary Examiner—Mark L. Bell
Assistant Examiner—J. Pasterczyk
(74) Attorney, Agent, or Firm—Ladas & Parry

(57) ABSTRACT

The present invention relates to a process for preparing a carrier used in olefin polymerization catalysts, comprising suspending anhydrous magnesium chloride in an inert hydrocarbon solvent and then under stirring, activating the magnesium chloride with a $C_2$–$C_8$ alcohol at a temperature of 30° C. to 200° C., with the molar ratio of said alcohol to said magnesium chloride being in the range of 0.05 to 2.5. Moreover, in order to make the resultant catalysts more active, the process according to the present invention can further include a pre-dispersing step conducted prior to the activation step, wherein the dispersing agent is alkoxides of titanium or $C_3$–$C_8$ alcohols and the molar ratio of said dispersing agent to said magnesium chloride is 0.01 to 2.0. The catalyst prepared from the resultant carrier is suitable for polymerizing ethylene or compolymerizing ethylene with alpha-olefin.

12 Claims, No Drawings

PROCESS FOR PREPARING A CARRIER USED IN OLEFIN POLYMERIZATION CATALYSTS

FIELD OF THE INVENTION

The present invention relates to a process for preparing a carrier used in olefin polymerization catalysts, and more particularly, to a process for preparing a carrier used in Ziegler-Natta high-efficiency solid catalyst component.

BACKGROUND OF THE INVENTION

It is well known that high-efficiency supported catalysts for polymerizing olefins are prepared by using inorganic materials such as magnesium chloride and the like as the carrier and supporting a transition metal compound onto it, and that the properties of the carrier are very important. In early stages, magnesium chloride carriers were mainly prepared by employing a grinding method, which is disadvantageous in that the resultant catalysts have a poor particle morphology and thus the polymers produced by employing such catalysts also have a poor particle morphology, more fine powders and a low apparent density.

Later on, it is proposed to prepare a carrier by employing a chemical method wherein a magnesium compound is dissolved certain solvents and is then precipitated to obtain the carrier having a uniform particle size distribution. For example, Chinese Patent Application Publication No. CN1085569A discloses a process for preparing a titanium catalyst, wherein a magnesium halide is contacted with an alcohol having at least 6 carbon atoms in a hydrocarbon solvent to form a magnesium solution, and is then reacted with an organoaluminium compound to form a solid magnesium-aluminium complex. The solid magnesium-aluminium compolex is suspended in a hydrocarbon solvent and then to the resulting suspension is added a tetravalent titanium compound to form a solid titanium catalyst suitable for polymerizing ethylene.

Now many attempts have been made to further develop supported catalysts having a controllable morphology. By employing such catalysts, it is possible to prepare polymers having a particle morphology similar to that of the catalysts and having high flowability, thus simplifying the procedures involving the preparation and/or post-treatment of the resulting polymers.

U.S. Pat. No. 4,399,054 discloses solid catalyst components for the polymerization of propylene, having a particle size of 1 to 100 microns. The carrier used for the components is an adduct having the formula $MgX_2 \cdot nED$, wherein X is a halogen, n is a number from 1 to 3 and ED is an electron-donor compound containing active hydrogen atoms such as ethanol and the like. Said carrier is prepared by passing a homogeneous emulsion of the molten adduct through a pipe under turbulent conditions and quenching the emulsion to partially dealcoholize.

Chinese Patent Application Publication Nos. CN1089622A and CN1047302A also empoly an adduct of a magnesium halide with an alcohol as the carrier for solid catalyst components. The adduct is prepared by adding an alcohol to a magnesium halide in the presence of an inert hydrocarbon solvent to form a solution and has a higher content of alcohol, for example larger than 3 moles, and then the carrier for catalyst components is obtained by removing some of the alcohol from the adduct. The alcohol is removed usually by heating or chemical treatment, and the removal of alcohol by chemical treatment is conducted by adding sufficient amounts of a dealcoholizing agent to react with OH groups contained in the adduct. The dealcoholizing agent is usually selected from consisting of the group of alkyl aluminium such as triethyl aluminium and triisobutyl aluminium, silicon halides and tin halides.

The object of the present invention is to provide a process for preparing a carrier used in olefin polymerization catalysts, which is simple and by which the resultant carrier has a narrow particle size distribution, while the solid catalyst components prepared from the carrier have high catalytic activity.

SUMMARY OF THE INVENTION

The present invention in its one aspect provides a process for preparing a carrier used in olefin polymerization catalysts, comprising suspending anhydrous magnesium chloride in an inert hydrocarbon solvent and then under stirring, activating the magnesium chloride with a $C_2$–$C_8$ alcohol at a temperature of 30° C. to 200° C., preferably 60° C. to 150° C., for 0.3 to 5.0 hours, with the molar ratio of said alcohol to said magnesium chloride being in the range of 0.05 to 2.5, preferably 0.1 to 1.0.

The present invention in its another aspect provides a process for preparing a carrier used in olefin polymerization catalysts, comprising suspending anhydrous magnesium chloride in an inert hydrocarbon solvent, pre-dispersing the magnesium chloride with a dispersing agent, with the molar ratio of said dispersing agent to said magnesium chloride is 0.01 to 2.0, and then under stirring, activating the magnesium chloride with a $C_2$–$C_8$ alcohol at a temperature of 30° C. to 200° C., preferably 60° C. to 150° C., for 0.3 to 5.0 hours, with the molar ratio of said alcohol to said magnesium chloride being in the range of 0.05 to 2.5, preferably 0.1 to 1.0.

DETAILED DESCRIPTION OF THE INVENTION

The $C_2$–$C_8$ alcohol used in the processes of the present invention can be ethanol, propanol, isopropanol, butanol, hexanol, octanol or the mixtures thereof, more preferably ethanol, isopropanol or butanol.

The inert hydrocarbon solvent used in the processes of the present invention can be $C_5$–$C_{15}$ alkanes or $C_6$–$C_8$ aromatic hydrocarbons, preferably $C_5$–$C_{12}$ alkanes, more preferably hexane, decane, heptane or octane. The weight ratio of the inert hydrocarbon solvent to anhydrous magnesium chloride is from 5 to 200, preferably from 20 to 100.

Upon activation, the stirring rate is controlled to be 30 to 3000 rpm, preferably 30 to 1000 rpm, most preferably 30 to 600 rpm.

The amount of $C_2$–$C_8$ alcohol used for activating the magnesium chloride in the processes of the present invention should be strictly controlled so that the molar ratio of alcohol/magnesium is in the range of 0.05 to 2.5. When the molar ratio of alcohol/magnesium is larger than 2.5, the magnesium chloride suspension will become too viscous and thus the carrier having a good particle morphology and a uniform particle size distribution can not be obtained; and when the molar ratio of alcohol/magnesium is less than 0.05, the resultant solid catalyst component will have very low activity.

In addition, the particle morphology and particle size distribution of the carrier produced by the processes of the present invention are closely related to the types and amounts of the alcohol used for activating. When ethanol is used for activating, the magnesium chloride suspension will become too viscous in the case of the molar ratio of alcohol/magnesium larger than 2.0 and thus a carrier having a uniform particle size distribution can not be obtained; and when butanol is used for activating, the magnesium chloride suspension will become too viscous in the case of the molar ratio of alcohol/magnesium larger than 1.0 and thus a carrier having a uniform particle size distribution can not be obtained.

Prior to activation by $C_2$–$C_8$ alcohol, anhydrous magnesium chloride may be preferably pre-dispersed by a dispersing agent, so as to avoid the adherence of the carrier during the preparation (which influences the particle morphology and the particle size distribution of the resultant carrier) and to obtain solid catalyst components having higher catalytic activity from the carrier. The conditions for pre-dispersing, such as temperature and the stirring rate, can be same as those in the activation step, and the molar ratio of the dispersing agent to anhydrous magnesium chloride is controlled to be in the range of 0.01 to 2.0. When the molar ratio of the dispersing agent to the magnesium chloride is larger than 2.0, the magnesium chloride will become dissolved or a colloid will be formed, which influences the particle morphology and the particle size distribution of the resultant carrier. The dispersing agent used for pre-dispersing can be selected from the group consisting of alkoxides of titanium having the formula Ti(OR)$_4$, wherein R is $C_2$–$C_6$ alkyl group, and $C_3$–$C_8$ alcohols, preferably tetrabutoxy titanium, tetraethoxy titanium, tetrapropoxy titanium, propanol or butanol.

The carrier produced by the processes of the present invention is suitable for preparing solid catalyst components for Ziegler-Natta catalysts and the solid components can be prepared by conventional titanium-supporting methods. For example, the carrier produced by the processes of the present invention in an inert hydrocarbon solvent, to the suspension is added a titanium halide in an amount such that the molar ratio of magnesium/titanium is 1:1–30, preferably 1:1–10, the resulting mixture is then reacted at a temperature of 30° C. to 200° C., preferably 60° C. to 150° C., for 0.5 to 5.0 hours. At the end of the reaction, the resulting solid is washed with an inert hydrocarbon to remove free titanium halide, thereby giving solid catalyst component particles having a particle size of 5 to 200 microns. The titanium halide used can be preferably TiCl$_4$, and the resulting solid catalyst component has a titanium content of 0.2 to 20.0 percent by weight.

The solid catalyst components prepared from the carrier produced by the processes of the present invention are suitable for polymerizing ethylene and copolymerizing ethylene with alpha-olefins. When used for (co)polymerizing, it is necessary to add as cocatalyst an alkyl aluminium, preferably triisobutyl aluminium, triethyl aluminium or tri-n-butyl aluminium, with Al/Ti ratio being suitably 20 to 800, preferably 20 to 300, by mole.

Since in the present invention, the carrier is directly prepared by suspending anhydrous magnesium chloride in an inert hydrocarbon solvent, the process according to the present invention can not only reduce the amount of alcohol used, but also eliminate the dealcoholization step and thus can simplify the preparation of the carrier, in comparison with the conventional processes which comprise firstly preparing a magnesium chloride . alcohol adduct and then partially dealcoholizing. Moreover, the solid catalyst component particles prepared from the carrier produced by the processes of the present invention have high flowability, narrower particle size distribution and higher catalytic activity.

EXAMPLES

The following examples illustrate the present invention in more details and the present invention is not limited to them.

Example 1

To a glass bottle equipped with a reflux condenser and a mechanical stirrer is placed 1.47 g(0.015 mol) of anhydrous magnesium chloride powder (manufactured by Fushun Petroleum Factory No. 3) under an atmosphere of nitrogen, followed by 30 ml of n-decane. The content is heated up to a temperature of 80° C. and 0.9 ml(0.015 mol) of ethanol is added dropwise under a stirring rate of 300 rpm to form a suspension containing uniform solid particles. The suspension is further heated up to 150° C. and reacted at that temperature for 1 hour. At the end of the reaction, the suspension is cooled down to 80° C. to obtain a particulate carrier having a particle size of 5 to 150 microns(measured by employing a laser particle size analyzer, Model MASTERSIZE/E, manufactured by Malvern Corporation, GB). To the resulting carrier is added 10 ml of TiCl$_4$ (manufactured by Beijing Zhonglian Chemical Reagent Factory) under stirring and the mixture is then heated up to 130° C. and reacted at that temperature for 2 hours. The resulting solid is washed four times with 120 ml of hexane and dried at 60° C. to obtain a solid catalyst component A, which has an average particle size of 33 microns and the particles having a particle size in the range of 10 to 100 microns are 90 percent by weight. The titanium content of Catalyst Component A is 2.62 percent by weight, measured by Inductively Coupled Plasma-Atomic Emission Spectrometry(ICP/AES).

Example 2

The solid catalyst component is prepared as described in Example 1, except that the amount of ethanol is changed to 1.4 ml(the molar ratio of alcohol/magnesium: 1.5). The resulting catalyst component B is particles which can flow easily, with a particle size of 10 to 100 microns. The titanium content of Catalyst Component B is 5.84 percent by weight.

Example 3

The solid catalyst component is prepared as described in Example 1, except that the amount of ethanol is changed to 0.45 ml(the molar ratio of alcohol/magnesium: 0.5). The resulting catalyst component C is particles which can flow easily, with a particle size of 10 to 100 microns. The titanium content of Catalyst Component C is 1.84 percent by weight.

Example 4

To a glass bottle equipped with a reflux condenser and a mechanical stirrer is placed 1.0 g(0.0105 mol) of anhydrous magnesium chloride (manufactured by Fushun Petroleum Factory No. 3) under an atmosphere of nitrogen, followed by 40 ml of n-decane. The content is heated up to a temperature of 130° C. and 0.8 ml(0.0105 mol) of isopropanol is added dropwise under a stirring rate of 600 rpm to form a suspension containing uniform solid particles which can sediment easily and stirring is continued at 130° C. for 1 hour to form a particulate carrier having a particle size of 5 to 150 microns. To the resulting carrier is added 6 ml of TiCl$_4$ (manufactured by Beijing Zhonglian Chemical Reagent Factory) under stirring and the mixture is reacted for 0.5 hour. The resulting solid is washed four times with 120 ml of hexane and dried at 60° C. to obtain a solid catalyst component D, which has an average particle size of 43 microns and the particles having a particle size in the range of 10 to 100 microns are 95 percent by weight. The titanium content of Catalyst Component D is 5.54 percent by weight.

Example 5

In this example, magnesium chloride is first pre-dispersed and then activated so as to prepare the carrier.

To a glass bottle equipped with a reflux condenser and a mechanical stirrer is placed 1.0 g(0.0105 mol) of anhydrous magnesium chloride(manufactured by Fushun Petroleum Factory No. 3) under an atmosphere of nitrogen, followed by 40 ml of hexane, The content is heated up to the reflux temperature of the mixture and 0.3 ml($8.8 \times 10^{-4}$ mol) of tetrabutoxy titanium[Ti(OBu)$_4$](manufactured by Beijing Changcheng Chemical Reagent Factory) is added dropwise under a stirring rate of 600 rpm and the resulting mixture is pre-dispersed at 60° C. under stirring for 1 hour to form a suspension containing uniform solid particles which can sediment easily. 0.6 ml(0.0104 mol) of ethanol is added dropwise and the resulting mixture is reacted for 1 hour to form a carrier having a particle size of 2 to 150 microns. To the resulting carrier is added 2.3 ml(0.021 mol) of TiCl$_4$ under stirring and the mixture is reacted at 60° C. for 0.5 hour. The resulting solid is washed four times with 120 ml of hexane and dried at 60° C. to obtain a solid catalyst component E, which has an average particle size of 30 microns and the particles having a particle size in the range of 10 to 100 microns are 80 percent by weight. The titanium content of Catalyst Component E is 7.41 percent by weight.

Example 6

The carrier and the solid catalyst component are prepared as described in Example 5, except that upon activating, 0.3 ml($5.2 \times 10_{-3}$ mol) of ethanol is used. The resulting solid catalyst component F has an average particle size of 34 microns and the particles having a particle size in the range of 10 to 100 microns are 85 percent by weight. The titanium content of Catalyst Component F is 6.14 percent by weight.

Example 7

The carrier and the solid catalyst component are prepared as described in Example 5, except that the amount of tetrabutoxy titanium is changed to 0.2 ml($5.88 \times 10^{-4}$ mol) and upon activating, 0.28 ml($3.06 \times 10^{-3}$ mol) of n-butanol is used. The resulting solid catalyst component G has an average particle size of 27 microns and the particles having a particle size in the range of 10 to 100 microns are 92 percent by weight. The titanium content of Catalyst Component G is 7.61 percent by weight.

Example 8

The carrier and the solid catalyst component are prepared as described in Example 5, except that upon pre-dispersing, 0.1 ml($2.94 \times 10^{-4}$ mol) of tetrabutoxy titanium is added and upon activating, 0.15 ml($1.64 \times 10^{-3}$ mol) of n-butanol is added. The resulting solid catalyst component H has an average particle size of 33 microns and the particles having a particle size in the range of 10 to 100 microns are 90 percent by weight. The titanium content of Catalyst Component H is 8.76 percent by weight.

Example 9

In this example, butanol is used as the dispersing agent to prepare the carrier and the solid catalyst component.

To a glass bottle equipped with a reflux condenser and a mechanical stirrer is placed 1.47 g(0.015 mol) of anhydrous magnesium chloride under an atmosphere of nitrogen, followed by 40 ml of n-heptane. The content is heated up to 80° C. and 0.3 ml($3.28 \times 10^{-3}$ mol) of n-butanol is added dropwise under a stirring rate of 300 rpm and the resulting mixture is pre-dispersed for 1 hour. After that time, 1.23 ml(0.021 mol) of ethanol is added dropwise and the resulting mixture is activated for 1 hour. To the resulting carrier is added 10 ml of TiCl$_4$ and the mixture is reacted for 0.5 hour. The resulting solid is washed four times with 120 ml of hexane and dried at 60° C. to obtain a solid catalyst component K, which has an average particle size of 23 microns and the particles having a particle size in the range of 10 to 100 microns are 85 percent by weight. The titanium content of Catalyst Component K is 3.98 percent by weight.

Examples 10–18

In these examples, ethylene is polymerized under normal pressure so as to study the reaction activity of the solid catalyst components.

A 500 ml three-necked flask equipped with a stirrer and a thermostatic system is displaced three times with nitrogen and then once with ethylene, and 100 ml of hexane, 2 ml of 1.5 mol/l solution of triisobutyl aluminium in hexane and 30 mg of a solid catalyst component are then added into the flask. The stirrer is started and then ethylene is fed. The polymerization is conducted at a temperature of 40° C. and a pressure of 0.1 MPa for 2 hours and then is quenched by 2 ml of ethanol to obtain polyethylene particles which can flow easily. The activity of the catalyst component is listed in Table 1.

Examples 19–21

In these examples, ethylene is polymerized under high pressure.

To a 2 liters autoclave is added 1 liter of dry hexane under an atmosphere of nitrogen, followed by 0.012 g of a catalyst component and 1.0 ml of 1.0 mol/l solution of triethylaluminium in hexane. The reaction mixture is heated up to 80° C. and then to the autoclave is fed hydrogen until a pressure of 0.26 MPa is reached. Ethylene is then continuously fed to the autoclave for 2 hours so that the total pressure inside the autoclave is maintained at 0.7 MPa. At the end of polymerization, polymers are isolated from hexane and dried to obtain polyethylene particles which can flow easily. The activity of the catalyst component and the properties of the polymers are listed in Table 2.

TABLE 1

| Catalyst Component Ex. | No. | Content of Ti, wt % | Catalytic Activity, gPE/gTi |
| --- | --- | --- | --- |
| 10 | A | 2.62 | 18700 |
| 11 | B | 5.84 | 8220 |
| 12 | C | 1.84 | 9674 |
| 13 | D | 5.54 | 10469 |
| 14 | E | 7.41 | 22483 |
| 15 | F | 6.14 | 21172 |
| 16 | G | 7.61 | 15768 |
| 17 | H | 8.76 | 11415 |
| 18 | K | 3.98 | 17185 |

TABLE 2

| | Catalyst Component | | Polethylene | | | |
|---|---|---|---|---|---|---|
| | | Activity, | Melt Index, | Particle Size, wt % | | |
| Item Ex. | No. | gPE/gTi | Ml$_{2.15}$ | <63 μm | 63–600 μm | >600 μm |
| 19 | K | 750000 | 1.21 | 2.5 | 94.5 | 3.0 |
| 20 | E | 930000 | 3.02 | 2.1 | 96.1 | 1.8 |
| 21 | D | 660000 | 0.88 | 2.8 | 95.3 | 1.9 |

What is claimed is:

1. A process for preparing a carrier used in olefin polymerization catalysts, comprising suspending anhydrous magnesium chloride in an inert hydrocarbon solvent and then, under stirring, activating the magnesium chloride with a $C_2$–$C_8$ alcohol at a temperature of 30° C. to 200° C., with the molar ratio of said alcohol to said magnesium chloride being in the range of 0.05 to 0.99.

2. The process according to claim 1, further comprising pre-dispersing said anhydrous magnesium chloride with a dispersing agent at a temperature of 30° C. to 200° C. prior to the activation step, wherein said dispersing agent is an alkoxide of titanium having the formula Ti(OR)$_4$ wherein R is a $C_2$–$C_6$ alkyl group, or a $C_3$–$C_8$ alcohol, and the molar ratio of said dispersing agent to said magnesium chloride is 0.01 to 2.0.

3. The process according to claim 1, wherein said $C_2$–$C_8$ alcohol used in the activation step is selected from the group consisting of ethanol, propanol, isopropanol, butanol, hexanol, octanol and mixtures thereof.

4. The process according to claim 2, wherein said dispersing agent is selected from the group consisting of tetrabutoxy titanium, tetraethoxy titanium, and tetrapropoxy titanium.

5. The process according to claim 2, wherein said dispersing agent is selected from the group consisting of propanol, butanol, hexanol, octanol and mixtures thereof.

6. The process according to claim 1, wherein said inert hydrocarbon solvent is selected from the group consisting of $C_5$–$C_{15}$ alkanes and $C_6$–$C_8$ aromatic hydrocarbons.

7. The process according to claim 6, wherein said inert hydrocarbon solvent is selected from the group consisting of $C_5$–$C_{12}$ alkanes.

8. The process according to claim 1, wherein said alcohol is added at a temperature of 60° C. to 150° C.

9. The process according to claims 1, wherein said $C_2$–$C_8$ alcohol is added at a stirring rate of 30 to 3000 rpm.

10. The process according to claim 2, wherein said dispersing agent is added at a stirring rate of 30 to 3000 rpm.

11. The process according to claim 2, wherein said dispersing agent is added at a temperature of 60° C. to 150° C.

12. The process according to claim 1, wherein said $C_2$–$C_8$ alcohol is added to the magnesium chloride in said activating step to form a suspension containing uniform solid particles.

* * * * *

UNITED STATES PATENT AND TRADEMARK OFFICE
CERTIFICATE OF CORRECTION

PATENT NO.    : 6,417,132 B1                                            Page 1 of 1
DATED         : July 9, 2002
INVENTOR(S)   : Junfeng Rong et al.

It is certified that error appears in the above-identified patent and that said Letters Patent is hereby corrected as shown below:

<u>Title page,</u>
Item [73], "Peirochemical" should read -- Petrochemical --, before "(CN)" insert
-- , Beijing -- and after "(CN)" insert -- Research Institute of Petroleum Processing Sinopec, Beijing (CN) --.
Item [30], "99/00847" should read -- 99100847 --.

Signed and Sealed this

Eighth Day of October, 2002

Attest:

Attesting Officer

JAMES E. ROGAN
*Director of the United States Patent and Trademark Office*